United States Patent [19]

Ueno

[11] Patent Number: 4,709,992

[45] Date of Patent: Dec. 1, 1987

[54] LIQUID CRYSTAL MATRIX DISPLAY DEVICE HAVING OPPOSED DIODE RINGS ON SUBSTRATES

[75] Inventor: Masakazu Ueno, Koyoso, Japan

[73] Assignee: Fuji Electric Co., Ltd., Japan

[21] Appl. No.: 939,616

[22] Filed: Dec. 9, 1986

[30] Foreign Application Priority Data

Dec. 10, 1985 [JP] Japan .................. 60-277459

[51] Int. Cl.$^4$ .................................. G02F 1/13
[52] U.S. Cl. .................... 350/339 R; 350/333
[58] Field of Search ..................... 350/333, 339 R

[56] References Cited

U.S. PATENT DOCUMENTS

| | | | |
|---|---|---|---|
| 4,413,883 | 11/1983 | Baraff et al. | 350/333 X |
| 4,485,380 | 11/1984 | Soneda et al. | 350/333 X |
| 4,523,811 | 6/1985 | Ota | 350/339 R X |
| 4,666,252 | 5/1987 | Yaniv et al. | 350/333 |

OTHER PUBLICATIONS

Togashi, S. et al., "An LC-TV Display Controlled by a-Si Diode Rings," *Proceedings of the SID,* vol. 26, No. 1 (1985), pp. 9–15.

*Primary Examiner*—Stanley D. Miller
*Assistant Examiner*—Richard Gallivan
*Attorney, Agent, or Firm*—Brumbaugh, Graves, Donohue & Raymond

[57] ABSTRACT

A liquid crystal display employs two transparent substrates between which are positioned the liquid crystal elements for excitation. One substrate includes a linear array of row control electrodes and one set of picture element electrodes and the other includes a linear array of column control electrodes and an opposite set of picture element electrodes. On each substrate, each picture element electrode is connected to a control electrode by way of a pair of single-stage diodes connected in parallel but oppositely poled.

2 Claims, 6 Drawing Figures

LIQUID CRYSTAL MATRIX DISPLAY DEVICE HAVING OPPOSED DIODE RINGS ON SUBSTRATES

FIELD OF THE INVENTION

This invention concerns an active matrix type liquid crystal matrix display device using thin film diodes as active elements.

BACKGROUND OF THE INVENTION

A common form of liquid crystal displays includes a pair of transparent substrates between which is located the liquid crystal active layer. On each of such substrates there are included a two dimensional array of picture element electrodes, or pixel electrodes, and a parallel array of linear control electrodes. On one of such substrates it is now common to include a plurality of diode rings, and a separate one of such diode rings is connected between each pixel electrode and one of the control electrodes. The diode rings are useful to improve the performance of the liquid crystal elements.

FIG. 2 shows an equivalent circuit of a conventional active matrix display using diode rings. In the figure, a separate diode ring 22, formed by connecting two diodes serially and further combining two such serial arrangements in parallel with the polarity being reversed, is inserted in series with liquid crystal 21 between each of row control electrodes 31, 32, and column control electrodes 41, 42, for increasing the threshold voltage. The liquid crystal 21 includes on opposite sides the picture element electrodes 21A and 21B. The linear row electrodes are arranged on one of the two substrates, the linear column electrodes on the other, the two arrays being orthogonal to form a two-dimensional rectangular array, and each electrode is associated with a row or column of picture element electrodes. As shown, each diode ring 23 is connected between a pixel electrode 21B and a row control electrode 31 and so would be located on the substrate including the row electrodes 31 and pixel electrodes 21B. The use of two diodes in series in each of the parallel branches doubles the threshold voltage needed to breakdown the diodes.

FIG. 3 shows a liquid crystal matrix device which L has been utilized hitherto, in which FIG. 3(a) is a plan view and FIG. 3(b) is a cross sectional view taken along line A—A thereof. A transparent electroconductive film formed on glass plate 1 is patterned to form pixel electrode 2 and row electrode 3. The row electrode 3 corresponds to the elements 31, 32, and pixel electrode 2 to electrode 21B shown in FIG. 2. Then, a pair of p-i-n diodes 5 made of three layers of amorphous silicon are sandwiched between chromium electrode layers 61, 62 and 63 as shown to constitute diode assembly 50 having two diode stages. The chromium layers are useful for preventing the entrance of light into the diodes, which would generate photocurrent and spurious signals. Accordingly it is necessary to make the thickness of layers 61 and 63 greater than 500 Å in order to obtain reliable light shielding. Moreover, since the thickness of each amorphous silicon diode is generally about 5000 Å, the total film thickness of the two stage diode assembly is greater than 1 μm.

Further, after forming over electrode 63 a silicon nitride film 7 in which a contact hole is made, conductor lead 8, of aluminum or the like, is deposited to connect the picture element electrode 2 with the upper electrode 63 of the diode. Another two stage diode assembly 40 of the same kind as that of the above-mentioned two stage diode is simultaneously formed on a portion of the picture element electrode 2 and by connecting its conductor lead 8 to the row electrode 3, a diode ring equivalent with the element 22 shown in FIG. 2 is completed.

There would similarly be prepared a substrate including a linear array of column electrodes and a two-dimensional array of pixel electrodes, without the diodes, and the two substrates are positioned opposite one another, properly oriented. Liquid crystal material is injected therebetween to complete the display device.

Since the height of the two stage diode is greater than 1 μm, as described above, failures such as breaks or short-circuits are apt to result from the steps in either the insulation film 7 or the conductor lead 8. It is possible to deposit the four diodes on a plane in order to prevent such troubles. However, since the area occupied by the diodes is doubled, the ratio of the area occupied by the picture element electrodes to the whole (the aperture ratio) is decreased, resulting in loss of brightness and contrast in the display.

OBJECT OF THE INVENTION

The object of this invention is to eliminate the foregoing drawbacks and provide a liquid crystal matrix display device which can be made with a high production yield because of a reduced tendency to experience breaks or shortcircuits without reducing the aperture ratio.

SUMMARY OF THE INVENTION

To this end, a display in accordance with the invention uses two transparent substrates, one including an array of row control electrodes and a set of picture element electrodes, the other including an array of column control electrodes and a set of picture element controls characterized in that in each substrate a diode ring comprising a separate pair of oppositely poled diodes in parallel is connected between each picture element electrode and a control electrode whereby on neither substrate is there required a diode assembly which is as thick as one micron. Thereafter the two substrates are positioned orthogonally as before so that the two arrays of control electrodes form a two dimensional array to control the liquid crystal elements positioned between the picture element electrodes of the two substrates.

BRIEF DESCRIPTION OF THE DRAWINGS

The invention will be better understood from the accompanying drawings in which.

DETAILED DESCRIPTION OF THE INVENTION

Figure 4:
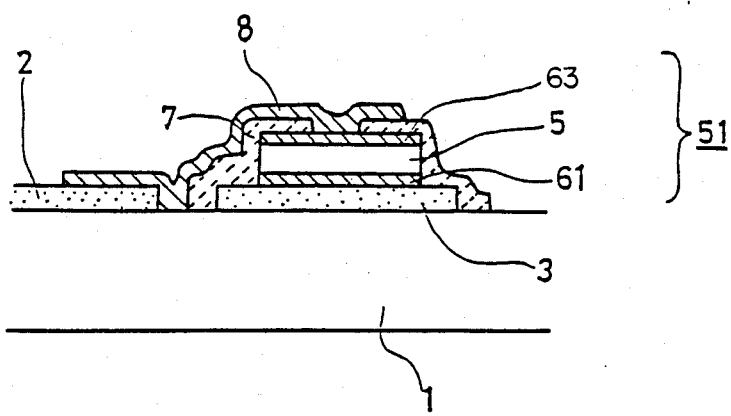
FIG. 4 is a cross sectional view of either of the substrates in an embodiment according to this invention.

Examples of this invention will be explained referring to the drawing. In each of the figures, the elements in common with those shown in the figures previously described carry the identical reference numerals. FIG. 4 is a cross sectional view taken through a diode portion of either substrate in one embodiment according to this invention. A layer of ITO (indium-tin-oxide) of a thickness of about 700 Å on glass plate substrate 1 formed by means of an electron beam vapor deposition process is patterned to form picture element electrode 2 and row control electrode 3 (or column control electrode) by photolithography. Chromium layers 61 and 63 are formed each to a thickness of about 1000 Å by means of electron beam vapor deposition process. The amorphous silicon layer 5 comprises the usual p-i-n structure and is formed to the total film thickness of 5000 Å by using a known plasma CVD process. Then, the chromium layers 61 and 63 and the amorphous silicon layer 5 are patterned by using photolithography. Chromium is etched by plasma etching in a gas mixture of $CCl_4+O_2$, while the amorphous silicon layer is plasma etched by using a mixture of $CF_4+O_2$.

In this way, after forming one stage diode 51, a silicon nitride film is formed to a thickness of about 200 Å for insulation by means of a plasma CVD process in a gas mixture of nitrogen and silane, and a contact hole is formed on the diode. Further, a layer of aluminum of a thickness of about 2000 Å formed by means of vapor deposition is patterned to serve as the conductive lead 8.

Figure 3A:
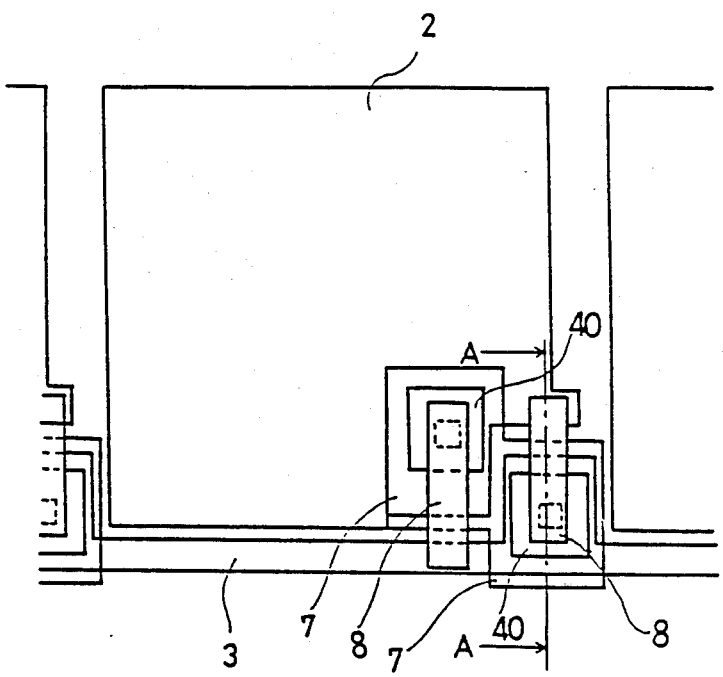
FIGS. 3(a) and 3(b) shows a conventional liquid crystal matrix device, in which 3(a) is a plan view for the row elecrode substrate and 3(b) is a cross sectional view taken along line A—A in FIG. (a)
Figure 3B:
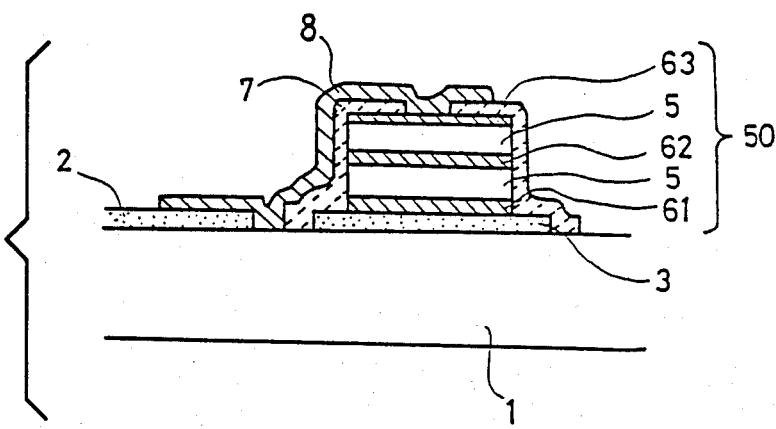

The plan view of this embodiment is quite the same as in the conventional structure shown in FIG. 3(a), except that a substrate for the array of column control electrodes is manufactured in the same manner also including one-stage diodes.

Figure 5:
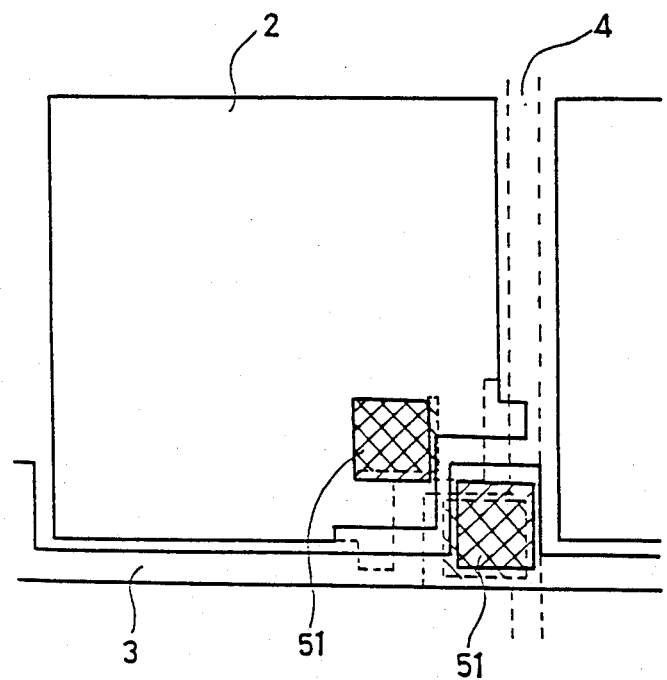
FIG. 5 is a plan view for one embodiment according to this invention.

In each substrate, each pixel electrode has a single stage diode connected between it and a control electrode. Then the two substrates are positioned opposite one another so that the regions of the diodes are almost opposed to one another and the row electrodes and the column electrodes are orthogonal so that a two dimensional matrix of linear control electrodes is formed. The liquid crystal material is then inserted between the two substrates to provide display elements between oppositely positioned pixel electrodes. FIG. 5 shows the state where the substrates thus disposed are superposed with one another, in which only the pixel electrode 2, and the row electrode 3, the column electrode 4 on another substate and the diodes 51 are shown for the sake of simplicity. The substrate having the row electrode formed thereon is shown by the solid line, while the substrate having the column electrode formed thereon is shown by the broken line. It can be seen that the pixel electrodes largely overlap one another, while the diodes 5 are substantially opposite one another. Accordingly, the aperture ratio does not substantially change, as compared with the conventional structure.

Figure 1:
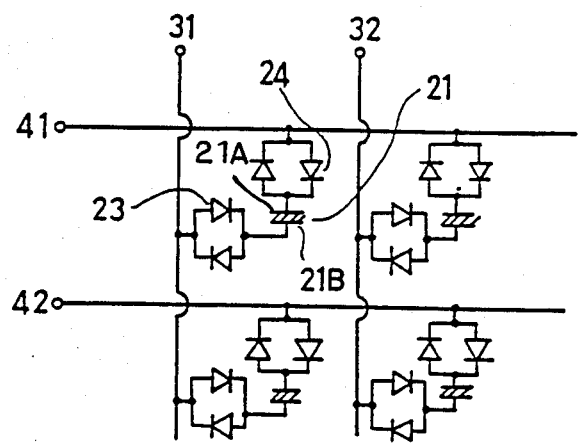
FIG. 1 is an equivalent circuit diagram for an embodiment according to this invention.
Figure 2:
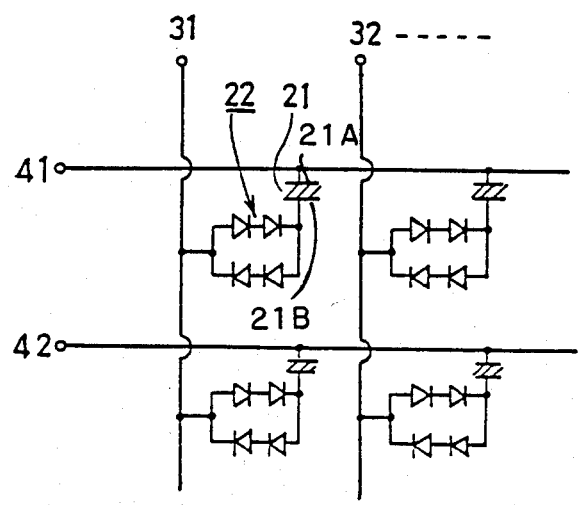
FIG. 2 is an equivalent circuit diagram for a conventional liquid crystal matrix display device.

FIG. 1 shows the equivalent circuit for this embodiment. Each diode ring 23 on the substrate of the row electodes is connected between one of the row electrodes 31, and a pixel electrode 21B. Each diode ring 24 on the substrate of the column electrodes is connected between one of the column electrodes 41 and a pixel electrode 21A. Each liquid crystal element 21 is connected between a pair of single-stage diode rings. The effective circuit is electrically equivalent with that of the conventional structure shown in FIG. 2, and the operation is also unchanged.

With this embodiment, failures due to breaks or short-cirucits are remarkably reduced because of the shorter height of the steps involved in the single stage diodes. In particular, yield have been found to improve considerably. When a failure rate of 500 diodes for a display of $500 \times 500$ picutre elements was tolerated, the yield improved from about 30% to about 90%, even making allowance for the fact that twice as many single-stage diodes are needed as are needed with two-stage diodes.

It should be appreciated that the specific embodiments described are merely illustrative of the basic principles of the invention. Various modifications can be made without departing from the spirit and scope of the invention.

In particular, various materials other than those mentioned are feasible. For example other transparent conductive material could be used to form the control electrodes and the picture element electrodes in place of ITO. Similarly materials other than chromium can be used for the diode electrodes including transparent materials if the diodes are not subject to light leakage problems.

Additionally, the diodes need not be PIN diodes using amorphous silicon, but Schotthy diodes and diodes using other semiconductors may be substituted.

Moreover, the shape of the picture elements can be modified as well as the pattern of the control electrodes.

What is claimed:

1. A liquid crystal matrix display comprising a pair of transparent substrates, between which is positioned a liquid crystal material for excitation, each substrate supporting an array of control elecrodes and a set of picture element electrodes, characterized in that on each substrate a diode ring comprising a parallel pair of oppositely-poled diodes is connected between each picture element electrode and its control electrode.

2. A display in accordance with claim 1 in which the two substrates are disposed so that the two sets of picture element electrodes substantially overlap, the control electrodes on the two substrates are substantially orthogonal, and the diode rings are nearly opposite.

* * * * *